W. W. WOODLEY.
PNEUMATIC DUST HANDLING SYSTEM.
APPLICATION FILED JUNE 3, 1911.
1,184,403.
Patented May 23, 1916.
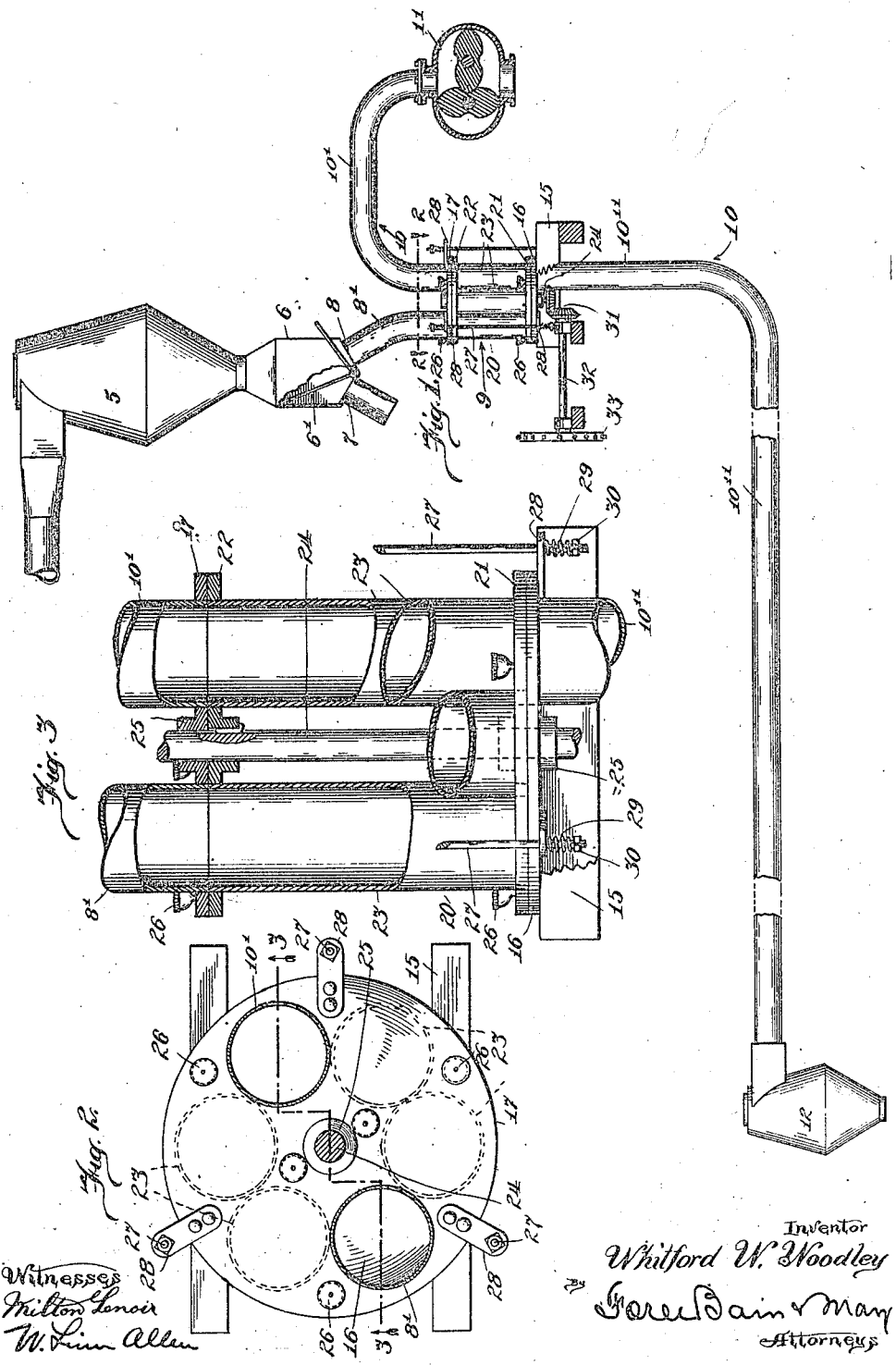
Inventor
Whitford W. Woodley

UNITED STATES PATENT OFFICE.

WHITFORD W. WOODLEY, OF ELIZABETH CITY, NORTH CAROLINA.

PNEUMATIC DUST-HANDLING SYSTEM.

1,184,403.      Specification of Letters Patent.      Patented May 23, 1916.

Continuation in part of application Serial No. 621,235, filed April 15, 1911. This application filed June 3, 1911. Serial No. 631,086.

*To all whom it may concern:*

Be it known that I, WHITFORD W. WOODLEY, a citizen of the United States, residing at Elizabeth City, in the county of Pasquotank and State of North Carolina, have invented certain new and useful Improvements in Pneumatic Dust-Handling Systems, of which the following is a specification.

My invention relates to pneumatic dust-handling systems, and particularly to "long-blow" systems for handling and delivering large volumes of miscellaneous material.

In my co-pending application Serial No. 621,235, filed April 15, 1911, I have disclosed an improved method of pneumatically handling miscellaneous material, *i. e.*, materials in which the particles are widely variant in those relations of surface to mass which affect the action of the particles under the influence of a conveying air current; and my present invention contemplates the provision of advantageous structures in a system suitable for the practice of the method disclosed in said companion application.

In the drawings, wherein I have illustrated an embodiment of my invention, Figure 1 is a diagrammatic view of a complete system; Fig. 2 is a plan view of a charging device; and Fig. 3 is a side elevation of the charger with its upper portion broken away on line 3—3 of Fig. 2.

In the drawings, 5 indicates a centrifugal dust collector of well known type, constituting in the system a source of materials supply suitable for constant delivery of material. The dust outlet of the collector 5 is connected to a valve casing 6, provided with two outlets 7 and 8, and equipped with a valve 6' by which the discharge of the collector may be directed through to either outlet. The outlet 7 may be arranged to deliver to a local receptacle or may be eliminated, and the outlet 8 is arranged to deliver to a feed pipe 8', for delivery of material into the blow piping system.

9 indicates in general a charger for receiving relatively compact charges of miscellaneous material from the pipe 8', and delivering such material in charges at timed intervals into a blow pipe 10, which is of small size, proportioned only to the volume of material to be handled, rather than to length of the pipe.

11 indicates a positive blower, typical of any suitable constant-volume variable-pressure air current generator, arranged to force air into the receiving end 10' of the blow pipe for delivery through the charger into the long discharge run 10''.

12 indicates a terminal dust collector of well known construction, which in many instances is employed to facilitate proper discharge of the material out of the conveyer system, but generically said terminal dust collector 12 may be regarded as merely an enlarged chamber for reducing the materials velocity and allowing the escape of the air, for in many systems the terminal dust collector may be omitted, and the piping arranged to discharge merely into an enlarged chamber wherein the material may settle and from which the air may escape. When a terminal dust collector 12 is employed, it is of small size, for, as hereafter shown, it handles only a small volume of air and has the material delivered thereto in advantageous fashion.

Each of the principal structures shown, except the charger 9, is of construction well known upon the market and needs no specific description. Of course, the specific construction of the charger may be varied, but for the handling of miscellaneous material such as that from a wood working plant or other mill, its structure should be such that it may receive and deliver materials widely variant in character without clogging and without substantial air leakage.

In the specific charger construction shown, 15 is a frame supporting a base plate 16, through which the discharge end 10'' of the blow pipe opens, said plate 16 being opposed by an upper head 17 through which the pipes 8' and 10' open, preferably at diametrically opposite points. Between these plates is arranged the rotatable drum, generally indicated at 20, preferably consisting of lower and upper heads 21 and 22, and a series of tubes 23, of any suitable number, each opening through both of the heads 21 and 22, and preferably so arranged that when one tube 23 registers with pipe 8', another registers with pipes 10'—10'' of the blow pipe 10, as illustrated in Fig. 3. The drum so constructed is carried in rotation by a central shaft 24, for which suitable bearings are provided as at 25. The contacting plane surfaces of the heads and plates of the drum and frame are preferably kept well oiled and substantially in air-tight contact. To this end, cups are suitably located near the periphery and near the center of said parts, and the plates 16 and 17 are maintained under pressure toward their respective drum heads as by the provision of tension rods 27, at suitable peripheral intervals, extending through lugs 28 on the plates 16 and 17, said rods being surrounded by tension springs 29 bearing between said lugs 28 and tension-adjusting stop nuts 30, upon the rods.

Any suitable driving means for the shaft 24 may be provided as herein typified by the gearing 31, shaft 32, and pulley 33, and while a constant or steady, rather slow, rotary motion of the shaft 32 gives good practical results, I prefer that the power appliance for rotating pulley 33 be arranged in any well known fashion to give a relatively long dwell when a charger tube is in register with the pipes, and a relatively quick movement of the drum to bring successive charger tubes into such register with the pipes.

It will be observed that the charger construction is such that there is little possibility for air leakage through the joints between a charger tube and the blow piping sections 10' and 10'' for the possible lines of air leakage are minimized in extent, and the tensional connection of the end plates, while permitting easy rotation of the drum and automatic compensation for irregularities in the coacting surfaces, nevertheless maintains the surfaces always in efficient contact. Further, it will be noted that the possibility of clogging the charger is minimized, and the device is capacitated for handling such difficult materials as wood refuse for the reason, among others, that each tube as it moves out of register with the feed pipe 8' exerts a shearing effect as between the rear edge of the tube orifice (with reference to the direction of rotation) and the front edge of the feed pipe orifice.

The salient operation of the charger is automatically to deliver into the blow piping relatively concentrated charges of miscellaneous material at substantially regular intervals, and the object of so delivering the miscellaneous material in charges into the blow pipe with appreciable intervals between charges is to create initially in the discharge pipe spaces comparatively free from material, such a space following each charge and each such space providing an area into which the slower traveling or frictionally retarded particles of the preceding charge, gradually becoming separated from the main mass of the charge, may travel without retarding the velocity of particles of subsequent charges or piling up and forming resistance areas against the progress of the material through the long discharge pipe.

While my system is widely adaptable to different fields of operation, its advantages may well be illustrated by reference to its use in handling the dust products of woodworking plants, wherein the material to be handled varies from blocks and splinters to saw dust and powder. By the use of my system, I find it to be possible, in actual practice, greatly to reduce the initial cost, and also the continuing power expenditure for handling large volumes of such miscellaneous materials over long blows, and at the same time to secure a certainty of operation and absence of stoppages which heretofore has been impossible in systems of the character heretofore commonly used.

In the operation of the system, the air current generator of a constant volume type, working upon a small discharge pipe, will give the requisite air velocity with a relatively small expenditure of power. The charger, introducing material at intervals from the source of supply into the blow piping in relatively concentrated masses, facilitates the handling of the material over long blows, say upward of 500 feet, in a fashion to maintain the entire material contents of the piping traveling at high velocity and in condition for discharge in a relatively concentrated mass. Of course, some particles of each charge by reason of frictional resistance of peculiarities of individual character, tend to travel more slowly than other particles differently characterized, so that from the time of introduction of the charges into the piping they tend gradually to spread out so that ultimately they meet each other in a substantially evenly traveling stream after a large part of the distance from the intake point to the discharge point has been traversed, and without having the velocity of the traveling mass as a whole materially reduced. Along toward the end of the discharge pipe 10'', where the air pressure is of course reduced, there is a tendency of the material on the surface of the traveling mass to run ahead of the slower traveling particles, but these incipient accumulations promptly cause additional resistance in the discharge pipe which the positive blower instantly meets by increased pressure engendered by the continuing introduction of constant volumes of air, so that the upper particles in travel cannot clog the pipe in the presence of this automatically augmenting pressure. but the incipient masses merely break or roll over, the "breakers" dissipating themselves in the presence of the nearly constant air velocity, which thus keeps the whole mass—formed of the spread-out charges,—traveling in an almost even layer, and with, as a whole, close to uniform velocity to the ultimate point of discharge. All of the factors of the smaller volume of air, delivery of material in concentrated mass into the piping, uniformity of travel, and automatic augmentation of pressure in the piping whenever the massing tendency occurs, contribute to the effect of tending to keep the lighter and heavier materials particles from separating or stratifying, and I find that at the delivery end of the long discharge pipe, the heavier and lighter particles are so intermingled and so uniformly delivered that there is comparatively little tendency of the lighter dust particles to scatter, they being carried in mass by the heavier particles, so that there is much less tendency for the dust to escape into atmosphere at the discharge end of the system than is evidenced in the old systems. In practice, I find that the discharge at the delivery end is so uniform in many instances that no terminal dust collector need be used, but where a terminal dust collector is employed as indicated in the drawings, it may be made very small on account of the relatively small volume of air handled, and the delivery of the materials in relatively concentrated form.

While I have herein described in considerable detail a specific embodiment of my invention, it will be understood that I do not desire to be limited thereto, as many changes may be made in the system for the practice of my invention within the spirit of my invention and within the scope of the appended claims.

What I claim as new and desire to secure by Letters Patent is:

1. In a system for handling heterogeneous materials, a charger comprising a movable series of chambers each having an opening for reception of materials or of a materials-discharging air-blast and an opening for discharge of materials and air, a source of materials supply, a pipe leading from said source of supply to a point for register with the first said opening of each of the chambers in the movement thereof past said point, a constant-volume variable-pressure air blower, a short pipe leading from the blower to another point for register with said first said opening of each of the chambers subsequent to the passage thereof past the point for registry with the pipe from the source of supply, a receptacle remote from the charger to receive materials, and a long pipe leading to said receptacle from a point for register with the remaining opening of that chamber whose first said opening is in register with the short pipe which leads to said constant-volume variable pressure air blower.

2. In a system for handling heterogeneous materials, the combination of a charger comprising upper and lower plates, the latter having a perforation alining with one of two perforations in the other plate, and a series of open-ended peripherally closed chambers rotatable between said plates to successive points with one chamber registering with the alining openings and another chamber registering with the remaining opening, a pipe leading upwardly from said remaining opening to a source of materials supply, a short pipe leading from the upper of the two alining openings, a constant-volume variable-pressure air-current generator connected at the end of said short pipe, a long pipe leading from the lower of said two alining openings, a dust-receiving chamber at the end of said long pipe, and means to move said series of open-ended cylindrical chambers to said successive positions to effect filling of one chamber and forcible air-impelled discharge of a previously filled chamber in regular automatic succession.

3. In a system for handling miscellaneous or heterogeneous material of the class described, the combination of a source of miscellaneous-materials supply normally exposed to atmospheric pressure; a distant receptacle; a constant-volume variable-pressure air blower adjacent to the source of materials supply; a long-blow small-diameter pipe proportioned in diameter to the volume of material to be handled connecting the receiving receptacle and the air blower; and a charger, adjacent to the source of material supply and blower, coöperating with both thereof, and comprising a series of chamber-structures, arranged successively to be brought into communication each, first, with the source of material supply while closed to the blow piping and, thereafter into the line of communication between the blower and the blow-piping; and means for so moving said chamber structures.

In testimony whereof I hereunto set my hand in the presence of two witnesses.

WHITFORD W. WOODLEY.

In the presence of—
J. B. JENKINS,
A. S. MANN.